Feb. 6, 1968    C. W. COPELAND    3,367,220

MACHINE TOOL CUTTER HEAD

Filed May 25, 1966    2 Sheets-Sheet 1

INVENTOR:
C.W. COPELAND
BY: James E. Nilles
ATTORNEY

Feb. 6, 1968  C. W. COPELAND  3,367,220
MACHINE TOOL CUTTER HEAD
Filed May 25, 1966  2 Sheets-Sheet 2

INVENTOR:
C. W. COPELAND
BY James E. Nilles
ATTORNEY

United States Patent Office 3,367,220
Patented Feb. 6, 1968

3,367,220
MACHINE TOOL CUTTER HEAD
Charles W. Copeland, "Daneor" Biddulph Road,
Mossley, Congleton, Cheshire, England
Filed May 25, 1966, Ser. No. 552,799
Claims priority, application Great Britain, May 28, 1965,
22,661/65
10 Claims. (Cl. 82—35)

ABSTRACT OF THE DISCLOSURE

A cutter head for holding a workpiece in a machine tool and including a pair of annular, spaced apart plates between which cutting tool carriers are mounted for swinging between operative and inoperative positions.

---

The present invention relates to machine tools and in particular to cutter heads for turning bar stock.

It is known to use rotary cutter heads for turning bar stock wherein the bar is fed through the head axially during turning. The usual arrangement of the cutter head includes a casting, forging or fabricated back plate of annular form upon one face of which are mounted a series of steady rollers for the bar. When three such rollers are used it is normal practice to space them around the inner periphery of the annular back plate at about 100° C. spacing thus leaving room on the back plate for the location of a cutting tool.

The prior art steady rollers and the cutting tool are usually adjusted by means of simple adjusting screws and thus it is difficult to insure that accurate setting is achieved unless the operator is highly skilled. Normal practice calls for the removal of the cutter head from the machine to allow it to be set on a bench and consequently each time it is necessary for the cutter and steady rollers to be adjusted the machine is idle for a considerable period of time not only while the head is being re-set but also while it is being taken off and replaced on the machine.

Steady rolls and the cutter are subjected to high stresses and since these elements are mounted on a face of the back plate, the forces acting upon them causes damage or fracture of metal parts of the cutter head. To overcome this disadvantage, destructable parts have been incorporated in the roller carriers so that damage is minimized. Nevertheless, each time the destructable part is fractured, time is lost in replacing it and reassembling the head.

The present invention has for its object the provision of an improved cutter head in which the above disadvantages are substantially reduced.

According to the present invention, a cutter head is provided which has a pair of spaced apart annular plates, between which plates are pivotally mounted a plurality of lockable, radially disposed carriers for the cutting tool and the steady rollers. The arrangement is such that the carriers can be pivoted from an operative tool engaging position, to an inoperative position when desired for inspection and adjustment. The adjustment of the tool and the steady rollers is achieved accurately to fine limits by the use of micrometer adjustment means.

The invention will now be described further, by way of example, only, with reference to the drawings, in which.

Figure 1:
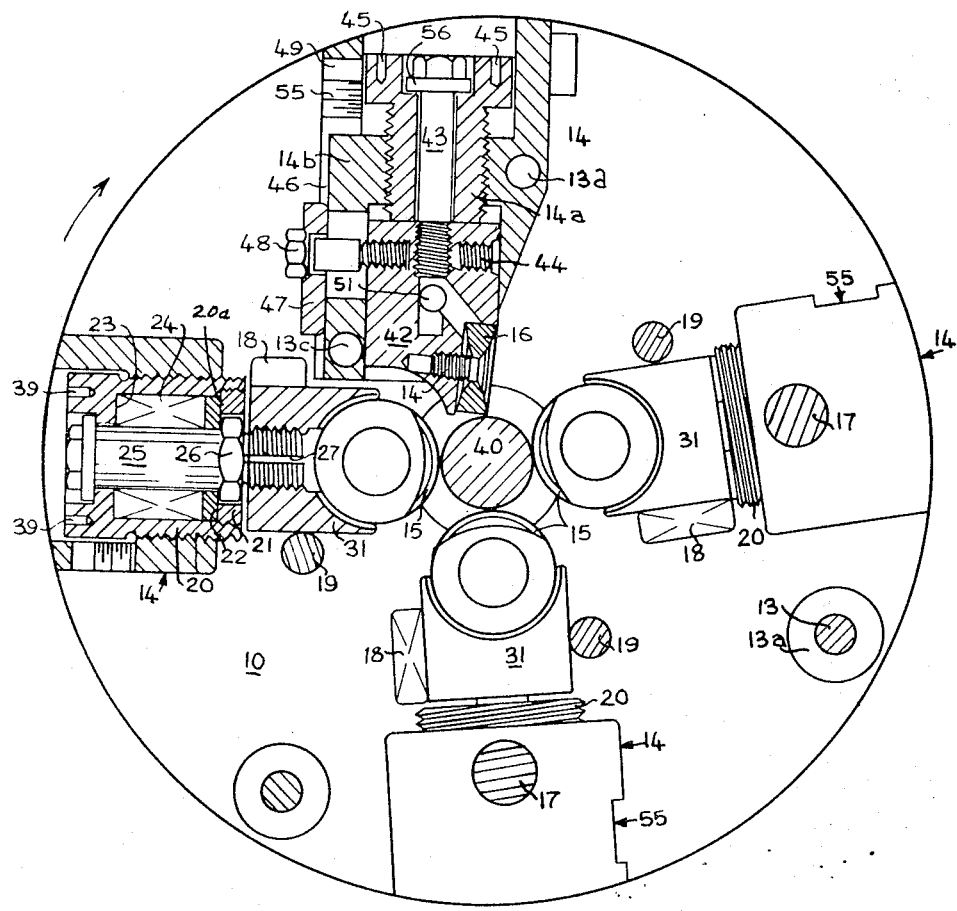
FIGURE 1 is an elevational view taken only generally along line 1—1 in FIGURE 2, of a cutter head made in accordance with this invention, certain parts being shown in section or omitted for the sake of clarity.

The cutter head made in accordance with the invention includes a pair of spaced-apart annular plates 10 and 11 held in spaced relationship by spacers 13a and bolt means 13. Plate 10 in turn is secured by cap bolts 10a to the end of a hollow drive shaft 12a.

A series of carriers 14 are positioned between the plates and are pivotable on their trunnions 17 through about 180°. In addition to the bolts 13 there are additional bolts (yet to be referred to) which assist in maintaining the members 10 and 11 in the required spacing.

All but one of the carriers 14 are adapted to carry a steady roller 15, the remaining carrier 14 serving to carry a suitable cutting tool of any desired shape, such as the circular tool 16.

The roller carriers 14 are all identical and thus one only will be described. It will be appreciated that different numbers of rollers or cutters may be employed.

The roller carrier trunnions 17 are seated in aligned bores in the plates 10 and 11 to permit the carrier 14 to be pivoted about an axis parallel to the axis of the plates 10 and 11, to bring the roller 15 to the position illustrated or alternating to a position outside the periphery of the plates 10 and 11.

Assuming that the cutter head is to rotate in a clockwise direction (FIGURE 1) there is provided a stop 18 adjacent the leading edge of each carrier 14 against which the carrier 14 can be clamped by a bolt 19 at the trailing edge of the carrier, which bolt passes through the members 10 and 11. It will be appreciated that when the bolts 19 are in position the carriers 14 are rigidly held against pivotal movement on their trunnions 17.

The inner periphery of the carrier 14 is screw threaded to receive a tubular roller adjustment assembly holder 20. The holder 20 is provided at its inner end with a shoulder 20a (FIGURE 1) and an internal screw thread adapted to receive a clamping nut 21 which bears against a washer 22. A further shoulder 23 is formed adjacent the outer end of the holder 20 and between the washer 22 and the shoulder 23 there is provided resilient means in the form of a pack of Belleville springs or washers 24 which can be loaded to any required amount and retained by the nut 21. The washer 22 has an inner diameter which is less than the inner diameter of the nut 21 and thus serves for the mounting within the holder 20 of a rotatable core 25 provided with an integral external collar 26 arranged to rest on the washer 22. The collar 26 is hexagonal in shape and can thus be used as a nut to rotate the core 25 in the holder 20.

The core is hollow (FIGURE 2) and is internally screw threaded outwardly (relative to the axis of the members 10 and 11) of the collar 26 and externally screw threaded inwardly of the collar. Inwardly of the collar the core is also provided with a longitudinal split 27 and an internal shoulder 28. A grub screw 29a passes into the core 25 from its outer end and this screw bears up against a core expander plug 30. When the screw 29a is tightened the core expander plug 30 presses against the collar 28 to cause the inward end of the core to expand and its screw thread to bind against a slidable block 31 mounted in the carrier 14. In addition to the screw 29a there is provided in the outermost end of the core 25 a bolt 29 which bears against a washer 56. The washer bears against a collar 56a formed in the outer end region of the holder 20. The retaining ring 21, bolt 29 and washer 56 serve to hold the core 25 in the correct position in the holder 20. The threads of the bolt 29 and the holder 20 are of opposite hand. The block 31 has a concave semi-circular end face and midway between the ends of this face there are two spaced apart internally raised shoulders or bosses 32.

The block is drilled and tapped at positions such that the tapped holes 33 pass through the centres of the bosses 32. Bolts 34 pass through the holes 33 into carrier plates 35 for the roller 15. The roller 15 is provided with stub axles 36 and these are carried in anti-friction bearing means in the form of needle bearings 37 mounted in the carrier plates 35. The carrier 14 is provided in its outer end region (relative to the axis of the members 10 and 11) with a micrometer scale 38 and the outermost face of the holder 20 is provided with a pair of diametrically opposed blind axial bores 39.

When all the bolts of the carrier 14 are locked up, the position of the rollers 15 is still capable of being adjusted radially while maintaining the distance X (FIGURE 2) constant. Should it be desired to alter the position of the rollers 15, to accommodate a larger or smaller diameter workpiece bar 40, it is necessary to rotate the holder 20 by means of a key (not shown) inserted in the blind bores 39. Rotation of the holder 20 causes the roller 15 to move towards or away from the longitudinal centerline of the cutter head in the carrier 14. Inward movement of the roller 15 is caused because the washer 22 bears against the collar 26. Outward movement is caused because the core 20 bears against the washer 56 thus to pull the roller 15 away from the centerline of the cutter head. Exact amounts of movement in either direction are measurable by means of the micrometer scale 38 which as shown particularly in FIGURE 3 consists of the scale on the holder 20 and the scale on the carrier 14. The latter scale is observable through a window 55 on the carrier.

Figures 2, 3:
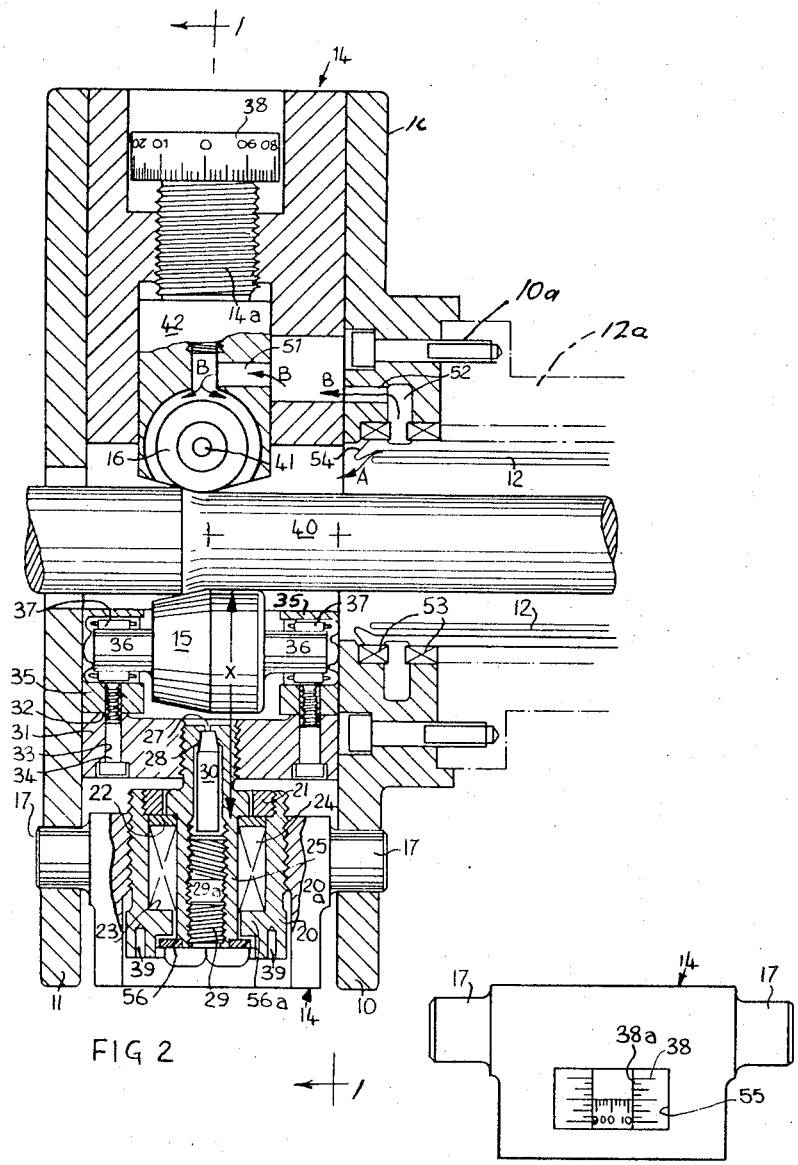
FIGURE 2 is a sectional, side elevation view taken generally through the center of the cutter head of FIGURE 1.
FIGURE 3 is a detail of part of the cutter head as shown in FIG. 2.

To obtain a rough setting the holder 20 is positioned with a shoulder 20a in line with a particular mark on the carrier scale. To set the roller accurately it is then necessary to align a particular scale marking of the holder 20 with one edge 38a of the carrier scale as shown in FIGURE 3.

The distance X remains constant because the screw threads of the core 26 and the block 31 are locked by means of the core expander plug 30. Because the distance X remains constant the micrometer scale is accurate and even after grinding the roller 15, which is necessary periodically due to wear, the distance X can be re-set by unlocking the threads of the core 25 and block 31; rotating the core by the amount necessary to compensate for the reduction in dimensions of the roller 15 and re-locking the threads.

It will be appreciated that the cutter 16 will wear in time and that the diameter of the bar 40 being turned will increase and thus pressures on the rollers will increase tending to force them outwardly. When this occurs the Belleville washers 24 will be compressed to compensate for the increased loads applied to the rollers 15.

The cutter carrier 14 will now be described. The tool 16 is made from any metal cutting material, is of disc form, and its periphery forms the cutting face. The tool is provided with an axial hole through which passes a bolt 41 which enables the tool to be secured onto a platform 42 of circular cross-section which is slidably located in the housing 14. The tool platform 42 is drilled and tapped centrally from its rearward face (relative to the axis of the plates 10 and 11) to receive a bolt which passes through an externally screw threaded core 14a in the housing 14. A grub screw 44 passes into the platform from one side to bear against the bolt 43 to prevent undesirable rotation thereof.

The internal configuration of the housing 14 is such that an internal collar 14b is formed and this is screw threaded to receive the core 14a. The core 14a is T shaped in cross section the head of the T lying outwardly of the collar 14b (relative to the axis of the plates 10 and 11). A pair of diametrically opposed blind bores 45 are formed parallel to the axis of the core 14a. One side of the housing 14 is provided with a slideway 46 in which is located a square locking plate 47 through which passes a bolt 48 which itself is screwed into a drilled and tapped hole in the platform 42. The locking plate 47 is drilled eccentrically so that it can be used to pre-set the tool in any one of four different exactly known positions relative to the rollers 15. The tool platform being rotatable about its axis can thus be set at any one of four rotational positions depending upon the way in which the locking plate 47 is located in the slideway.

One face of the carrier 14 is provided with a scale 49 and adjustment of the position of the tool 16 is made in a manner similar to that of the rollers 15.

In order to feed coolant gas or liquid to the tool 16 the shaft 12a is provided with spaced apart tubes 12 and which together form an annular space through which the coolant can pass. The tool platform is bored transversely as at 51. The carrier 14 is provided with bores 52 which communicate with the tool platform bore 51. Sealing rings 53 are provided at the shaft end of the bores 52. Internally of the sealing rings 53 is provided a deflector 54. The coolant flow is thus in two streams, one stream A being directed onto the bar itself and the other stream B through the bores 51 and 52 to the tool 16. The streams A and B are indicated by arrows.

It will be understood that the scale on the bearing 14 for the tool 16 co-operates with a scale marked on the core 14a to give micrometer indication of the tool position radially. If it is found that access to bolt 41 is difficult with the tool in position it is of course possible to rotate the assembly. This is achieved by removing bolt 13d and slackening bolt 13c so that the assembly can rotate about bolt 13c. This will bring the bolt 41 into an accessible position and replacement or adjustment of the cutting tool is achieved easily. The assembly is then pivotable into its working position and can be secured thereat by tightening bolt 13c and replacing bolt 13d.

When it is necessary to re-grind a roller 15 it is not essential that the cutter head is out of operation for any length of time since spare assemblies can be held in stock and can be substituted by pivoting a carrier 14 through approximately 180° to enable its complete removal and replacement by a substitute carrier.

Various modes of carrying out the invention are contemplated as being within the scope of the following claims particularly pointing out and distinctly claiming the subject matter which is regarded as the invention.

I claim:

1. A machine tool cutter head comprising, a pair of annular plates rigidly secured together in spaced apart, parallel relationship, said plates having a central opening through which a workpiece is adapted to pass, a plurality of carriers circumferentially spaced around said plates and located therebetween, said carriers having a radially inner end, shiftable means on some of said inner ends for mounting steady rollers for said workpiece, and shiftable means on at least one of said inner ends for mounting a cutting tool for said workpiece, said carriers being pivotally mounted on said plates for swinging between (1) an operative position in which said rollers and tool engaged said workpiece, and (2) in inoperative position in which said inner end is swung outwardly away from said workpiece.

2. A cutter head as claimed in claim 1 including micrometer adjustment means on said carriers for accurately adjusting said shiftable means.

3. A cutter head as claimed in claim 1 in which the carriers are trunnion mounted for pivotal movement about axes parallel to the longitudinal axis of the carrier.

4. A cutter head as claimed in claim 1 including stops against which the carriers can be locked and removable locking bolts for locking said carrier.

5. A cutter head as claimed in claim 1 including a roller adjustment assembly resiliently mounted in the carrier, and adjustment means for adjusting said assembly.

6. A cutter head as claimed in claim 5 further characterized in that said assembly includes a pack of Belleville washers.

7. A cutter head as claimed in claim 5 including an adjustable block, anti-friction bearings mounted in said block, and said roller is maintained in said bearings.

8. A cutter head as claimed in claim 1 in which the shiftable means for said tool is provided with a longitudinally adjustable and lockable cutter platform.

9. A cutter head as claimed in claim 8 including locking plate means for locking the cutter platform in any one of a plurality of positions.

10. A cutter head as claimed in claim 9 in which the cutter platform is adapted to be adjusted by said micrometer adjustment means.

References Cited
UNITED STATES PATENTS

| | | | |
|---|---|---|---|
| 2,321,281 | 6/1943 | Collins | 82—35 |
| 2,845,827 | 8/1958 | Brauer | 82—20 |

LEONIDAS VLACHOS, *Primary Examiner.*